United States Patent [19]
Scheps

[11] Patent Number: 5,285,467
[45] Date of Patent: Feb. 8, 1994

[54] COMPACT, EFFICIENT, SCALABLE NEODYMIUM LASER CO-DOPED WITH ACTIVATOR IONS AND PUMPED BY VISIBLE LASER DIODES

[75] Inventor: Richard Scheps, Del Mar, Calif.

[73] Assignee: The United States of America as represented by the Secretary of the Navy, Washington, D.C.

[21] Appl. No.: 21,948

[22] Filed: Feb. 22, 1993

Related U.S. Application Data

[63] Continuation-in-part of Ser. No. 718,316, Jun. 17, 1991, Pat. No. 5,200,972.

[51] Int. Cl.$^5$ .............................................. H01S 3/09
[52] U.S. Cl. .................................. 372/69; 372/19; 372/92; 372/68; 372/41; 372/75
[58] Field of Search ....................... 372/68, 69, 41, 39, 372/75, 19, 92

[56] References Cited

U.S. PATENT DOCUMENTS

| | | |
|---|---|---|
| 3,270,290 | 8/1966 | Maurer . |
| 3,308,395 | 3/1967 | Sorokin . |
| 4,712,219 | 12/1987 | Yano et al. . |
| 4,740,975 | 4/1988 | Abrahams et al. ............... 372/41 |
| 4,740,977 | 4/1988 | Ikeda . |
| 4,802,180 | 1/1989 | Brandle, Jr. et al. . |
| 4,837,769 | 6/1989 | Chandra et al. . |
| 4,872,177 | 10/1989 | Baer et al. . |
| 4,901,330 | 2/1990 | Wolfram et al. . |
| 4,905,057 | 2/1990 | Ohishi et al. . |
| 4,942,582 | 7/1990 | Kintz et al. . |
| 4,953,166 | 8/1990 | Mooradian . |
| 5,029,335 | 7/1991 | Fisher et al. . |
| 5,090,019 | 2/1992 | Scheps ............................ 372/69 |
| 5,200,972 | 4/1993 | Scheps ............................ 372/69 |

OTHER PUBLICATIONS

K. Kubodera et al., "Stable LiNdP$_4$O$_{12}$ Minature Laser", *Appl. Opt.* 18, 884, (1979) to the cavity losses by.
D. Findlay et al's., "The Measurement of Internal Losses in 4–Level Lasers", *Phys. Lett.*, vol. 20 (1966), p. 277.
R. Scheps, "Efficient Laser Diode Pumped Nd Lasers", *Appl. Opt.*, 28, 89 (1989).

*Primary Examiner*—Léon Scott, Jr.
*Attorney, Agent, or Firm*—Harvey Fendelman; Thomas Glenn Keough

[57] ABSTRACT

Efficient, low threshold laser emission from a laser crystal doped with chromium and neodymium ions is obtained when pumped by visible laser diodes in the range of 610 nm to 680 nm. A typical laser Cr,Nd:GSGG crystal having an extraordinarily broad absorption bandwidth allows high pump efficiencies when using visible laser diodes, particularly in comparison to the Nd:YAG laser. The broad absorption bandwidth tolerance of the Cr,Nd:GSGG crystal to the pumping wavelengths allows visible diode pumping of the neodymium transition without regard to the wavelength of the visible diodes. Longitudinal or end-pumping to take advantage of the emission properties of the visible laser diodes, a nearly hemispherical laser resonator configuration and other co-doped Cr,Nd laser host materials are disclosed. Consequently, costs are reduced for the semiconductor pump as well as producing a compact, efficient, lightweight and reliable laser previously unachievable with other types of laser or lamp pumping. As an improvement in a laser pumped Cr,Nd:GSGG laser, diode pumping brings the advantages of high electrical to optical efficiencies and compact design. End-pumping with the visible diodes allows efficient utilization of the visible laser diode pump light and further allows a more ideal overlap between the inversion profile created within the laser crystal by the pump fluence and the TEM$_{00}$ resonator mode extracting fluence.

16 Claims, 7 Drawing Sheets

COMPACT, EFFICIENT, SCALABLE NEODYMIUM LASER CO-DOPED WITH ACTIVATOR IONS AND PUMPED BY VISIBLE LASER DIODES

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

This is a continuation in part of co-pending U.S. Patent application, Ser. No. 07/718,316, filed Jun. 17, 1991, now U.S. Pat. No. 5,200,922 entitled "Nd Laser With Co-Doped Ion(s) Pumped By Visible Laser Diodes" by Richard Scheps.

BACKGROUND OF THE INVENTION

The present invention relates to lasers and particularly to a laser diode pumped solid state laser for producing laser emission at one or more laser wavelengths.

Lasers are devices that generate or amplify light. The beams of radiation that lasers emit or amplify have remarkable properties of directionality, spectral purity and intensity. These properties have already led to an enormous variety of applications. The essential elements of the laser device are (1) a laser medium consisting of an appropriate collection of atoms, molecules, ions or, in some instances, a semiconducting crystal; (2) a pumping process to excite these atoms, molecules, etc., into higher quantum mechanical energy levels; and (3) suitable optical feedback elements that allow a beam of radiation to either pass once through the laser medium that is in a laser amplifier, or bounce back and forth repeatedly through the laser medium, as in a laser oscillator. The laser contains an optical cavity or resonator which is defined by highly reflecting surfaces which form a closed round-trip path for light. The laser medium is contained within th optical cavity.

The elements of a laser come in a great variety of forms and fashions. One type of laser medium that has numerous advantages compared to others is the solid state laser medium consisting of a laser crystal with one or more dopant ions that is, generally, optically pumped. The optical pump may be an incoherent source, such as cw lamps, including tungsten filament lamps or arc lamps, or pulsed lamps, such as flashlamps, or a monochromatic laser source. Monochromatic laser pump sources include ion lasers or dye lasers or semiconductor laser diodes, such as, an aluminum gallium arsenide (AlGaAs) laser diode operating at approximately 808.5 nm pumping a Nd:YAG solid state laser material. As an example of this type of laser, see the article "Efficient Laser Diode Pumped Nd Lasers" by Richard Scheps in *Applied Optics*, vol. 28, pp. 89–91 (January 1989).

In order for the optical pumping process to be effective, the photons incident on the laser medium must have certain properties. In particular, the pump radiation must be of a wavelength which is absorbed by the laser medium to generate either directly or indirectly the required population inversion for the desired laser transition.

Laser diode pumping of Nd:YAG lasers is well recognized. The laser diode output radiation must substantially match the desired absorption wavelength of the Nd:YAG laser medium, which in general, corresponds to a wavelength of 808.5 nm. This matching of the laser diode emission wavelength with the absorption wavelength and bandwidth of the Nd:YAG laser material at 808.5 nm is required for relatively efficient operation, both in terms of pumping efficiency, by which is meant the efficiency by which pump photons populate the upper laser level, and in terms of overall electrical power consumption by the pump diodes themselves to generate a specific amount of optical laser power from the Nd:YAG laser material. The absorption bandwidth of Nd:YAG is approximately 1 nm. It is both difficult and expensive to fabricate laser diodes or laser diode arrays with the proper power, bandwidth and center wavelengths required for efficient pumping of Nd:YAG laser media.

The typical AlGaAs semiconductor material pumping diodes have a naturally broad wavelength range over which they can produce radiation. That is to say, although the bandwidth of an individual AlGaAs semiconductor laser is relatively narrow, the center wavelength can vary over 50 nm or more from one device to another. This is due, partially, to the fact that the center wavelength is highly sensitive to the aluminum concentration in the AlGaAs active layer. An additional problem for AlGaAs laser diode pumping of Nd:YAG lasers is that the junction temperature of the pump diode requires accurate thermal control for efficient operation of the Nd:YAG laser due to the narrow absorption bandwidth at 808.5 nm since there is a well known shift of the semiconductor laser central wavelength of approximately 0.3 nm per degree Centigrade change in junction temperature.

Because the nature of the semiconductor laser diode is such that approximately 60 percent or more of the electrical power used to drive the diode is dissipated in the diode junction as heat, junction temperatures will rise dramatically as the device is turned on. Thermal control, therefore, is extremely important in terms of maintaining the appropriate temperature of the semiconductor diode junction to produce the proper center wavelength for the laser diode. Practical operating temperature ranges run generally from 10° C. to 30° C., and since center wavelength shifts with junction temperature of 0.3 nm per degree C., the 20 Centigrade degree operating temperature range for the semiconductor diode laser can produce at most a 6 nm shift in wavelength. Therefore, if the semiconductor laser diode that is intended to pump the Nd:YAG laser gain medium is not within just a few nanometers of 808.5 nm, then it is impractical to resort to cooling or heating of the semiconductor laser diode to try to achieve the proper emission wavelength from the semiconductor laser. In addition, control of the diode junction temperature over a range of semiconductor laser diode pump powers is cumbersome and adds complexity to the overall system.

The narrow absorption linewidth of Nd:YAG also increases the difficulty of modeling both the inversion profile resulting from volumetric deposition of the polychromatic pump excitation as well as modeling the effects of anticipated spectral shifts in the pump source due to aging; see for example of R. Scheps and J. F. Myers, "Performance and Aging of High Powered 2-D Laser Diode Arrays," *Applied Optics*, vol. 29, p. 341 (1990).

While individual laser diodes may have their central emitting bandwidth adjusted by temperature control of the junction, this capability does not apply to laser diode arrays that are used as the pumping source. These arrays generally consist of multiple semiconductor laser diode stripes on a single monolithic semiconductor laser substrate. The bandwidth and central wavelength variation from stripe to stripe must be considered and generally leads to a much broader emission bandwidth and a much less well-defined central bandwidth. From a pragmatic viewpoint, a specification requiring a high power, narrow band diode pumping array dramatically increases the cost of purchasing such a pump. Because, in practice, the diode pump array is often the single most expensive component in the laser head, the total cost can easily become prohibitive.

To address the issue of cost effective pumping, hosts for the Nd ion have been sought in which the width of the 800 nm absorption spectrum is increased. Two examples of such host materials are Nd:BEL, see the article by R. Scheps et al., "End-Pumped Nd:BEL Laser Performance," in *Optical Engineering*, vol. 27, p. 830 (1988), and Nd:YVO$_4$; see the article of R. A. Fields et al., "750 mW, 1.06 $\mu$m cw TEM$_{00}$ Output from a Nd:YVO$_4$ Laser End Pumped by a Single 20-Stripe Diode Array," in *Advances in Laser Science-III*, American Institute of Physics Conference Proceedings, Atlantic City, N.J., Vol. 172, pp. 20-22 (1987). Both of these Nd doped crystals have been diode pumped and have a significantly broader absorption bandwidth than Nd:YAG.

While Nd:BEL and Nd:YVO$_4$ may be promising, the largest practical absorption bandwidths for singly doped neodymium crystals are on the order of 5-10 nm at the 800 nm emission bandwidth for AlGaAs semiconductor laser diodes. The search for hosts where a neodymium absorption band is broader generally has led to materials where the neodymium emission cross-section is drastically compromised to the point where the emission becomes highly inefficient. In other words, although the pumping efficiency has increased, (a greater fraction of the pump photons are absorbed by the gain medium and subsequently populated the upper laser level), the extraction efficiency, (the ability to utilize the inverted population to produce laser emission), has been lowered dramatically.

An alternative approach to achieve high pump efficiency while maintaining high extraction efficiency is to co-dope the neodymium host material with an activator ion such as $Cr^{3+}$. By co-doping with chromium, the very broad absorption spectrum in the red (near 660 nm) can be advantageously utilized to increase the pump efficiency. Co-doping also improves the efficiency for flashlamp pumping. An example of a flashlamp pumped design is given in U.S. Pat. No. 4,837,769 by S. Chandra et al. called "Phase Conjugated Slab Laser Designator." See also the article by A. A. Kaminskii et al., "Luminescence and Stimulated Emission of $Nd^{3+}$ Ions in $Gd_3Sc_2Ga_3O_{12}$ Crystals," *Physics Status Solidi (a)*, vol. 34, p. K109 (1976). Relative to $Nd^{3+}$ the $Cr^{3+}$ ion absorbs most of the pump photons and is excited to the $^4T_2$ state. The excited $Cr^{3+}$ ion subsequently undergoes a rapid and efficient excitation transfer between the $^4T_2$ state of $Cr^{3+}$ and the $^4F_{3/2}$ Nd level. The $^4F_{3/2}$ Nd ion excited state is the upper laser level. This excitation transfer process therefore directly populates the upper laser level of the neodymium ion, from which lasing at 1.06 $\mu$ is observed.

The efficiency of transfer of energy from the $Cr^{3+}$ ion to the $Nd^{3+}$ ion has been measured to be 87 percent, by which it is meant that 87 percent of the pump energy which is initially absorbed by the $Cr^{3+}$ ion is transferred to the upper laser level of the $Nd^{3+}$ ion. Some of the excitation that initially resides in the $Cr^{3+}$ ion is lost through fluorescence, but it is to be noted that the $Nd^{3+}$ ion has strong absorption bands in the same spectral range as the $Cr^{3+}$ fluorescence. Therefore, an additional excitation transfer process occurs through absorption of the $Cr^{3+}$ fluorescence by the neodymium ion.

Previous results on laser operation of a Cr,Nd:GSGG laser have been reported. The host GSGG is gadolinium scandium gallium garnet and has the chemical formula $Gd_3Sc_2Ga_3O_{12}$. A report by D. Pruss et al., "Efficient $Cr^{3+}$ Sensitized $Nd^{3+}$ GdScGa-garnet Laser at 1.06 $\mu$m" which appeared in *Applied Physics B*, vol. 28, p. 355 (1988) identified the mechanism for excitation transfer. Only a krypton ion laser was used as the pumping source which emitted radiation at 647.1 nm. The use of a krypton ion laser make applications of a laser pumped Cr,Nd:GSGG laser based on the work of Pruss et al. highly impractical since for one thing, the ion laser is less than 0.01 percent efficient in terms of converting electrical efficiency to optical output. The krypton ion laser requires enormous cooling power and very high amperage laser drive current, typically over 100 amps at 220 volts to operate the ion laser. In addition, the pumping laser is very large and easily damaged because it contains a glass plasma tube so that portability, compactness and other features which might otherwise make this device more useful cannot be achieved with a krypton ion pump.

U.S. Pat. No. 4,740,975 by Abrahams et al. and U.S. Pat. No. 4,802,180 by Brandle, Jr. et al. also have discussed a laser pumped Cr,Nd:GSGG laser. Both of these patents are similar and focus on addressing the concepts of growing the laser medium crystal itself and specific techniques required to grow defect-free co-doped Cr,Nd:GSGG laser crystals. Both patents are slab-shaped designs to be side pumped and completely overlook the concept of an end-pumped Cr,Nd:GSGG laser.

There have been numerous patents issued for the concept of laser diode pumped neodymium doped lasers. Two patents have specifically mentioned diode pumped Cr,Nd:GSGG lasers. These are U.S. Pat. No. 4,901,330 by Wolfram et al. and U.S. Pat. No. 5,029,335 by Fisher et al. The Wolfram patent is concerned with generating optically pumped radiation from a laser diode array and mentions co-doped Cr,Nd:GSGG as a possible laser medium which can be utilized. However, the particular invention of Wolfram et al. would preclude good end pumping. More importantly, Wolfram et al. overlook the fact that the AlGaAs diodes which were used in the neodymium pumped laser materials, which will emit in the 800 nm range, are entirely useless for the co-doped material in the sense that they only pump the neodymium ion. These AlGaAs diodes, because of their emission bandwidth, can only pump the neodymium in the co-doped Cr,Nd:GSGG and cannot excite the $Cr^{3+}$ ion. Furthermore, Wolfram et al. fail to acknowledge that different pump wavelengths are required for the co-doped material in order to take advantage of the broad absorption band in the visible. Nor do they note the entirely different wavelength dependence and lack of wavelength matching criteria inherent in the $Cr^{3+}$ co-doped material relative to the singly doped neodymium materials that they address in their invention.

The Fisher et al. patent describes an improved heat dissipating package for a laser diode pumped neodymium doped laser. It mentions the problems involved in a wavelength mismatch between the pump emission and the laser medium absorption and specifically addresses the thermal shift in the emission wavelength of the pump laser diode that must be controlled adequately to maintain high pump efficiency. However, it shows a resonator which does not allow compact, efficient, end pumped operation when pumped by laser diodes. The Fisher et al. patent mentions co-doped Cr,Nd:GSGG as a potential laser medium which would be suitable in their inventive concept. The lack of sensitivity of the pump efficiency to the pump wavelength is not mentioned in the Fisher patent which is a benefit of using the co-doped material. The lack of wavelength sensitivity afforded by co-doped materials may obviate the need or motivation for Fisher et al.'s temperature compensation scheme. That is, although heat removal is nearly always a design consideration, the invention described by Fisher et al. is for the rapid and efficient removal of heat from the laser diode in order to match the laser diode wavelength to the narrow absorption linewidth in neodymium. Considering the broad absorption linewidth of chromium in the visible region of the spectrum, there is little, if any, need to control the wavelength of such a co-doped Cr,Nd:GSGG diode by thermal means.

An example of the types of problems which arise when dealing with the very narrow absorption bandwidth in neodymium doped materials, coupled with the broader emission profile and the shift in central wavelength for laser diodes, is represented in U.S. Pat. No. 4,942,582 by Kintz et al. This patent demonstrates a high output power laser which operates in a single longitudinal mode. Such operation is achieved because the end pumped laser diode fluence is absorbed in a very short axial distance within the crystal near the face that is pumped. In order to accomplish this, a laser diode source with a very narrow bandwidth is needed as the absorption depth in the crystal must be narrow. This requirement, of course, makes the selection of the diode and the operating conditions under which effective pumping of this material can occur (such as junction temperature) much more constrained and more complex, and as a consequence less efficient.

Thus in accordance with this inventive concept a need has been recognized for a neodymium laser that can be diode pumped with a high pump efficiency but is insensitive to the exact pump wavelength and bandwidth of the pump diodes.

SUMMARY OF THE INVENTION

The present invention is directed to providing an efficient, compact co-doped laser, for example, chromium neodymium $Gd_3Sc_2Ga_3O_{12}$ (Cr,Nd:GSGG), that assures a high pumping efficiency when end-pumped by visible light laser diodes which can operate anywhere in the region between 610 and 680 nm to produce efficient low threshold laser operation. The laser includes two components, a co-doped gain element and an output coupler mirror. The radius of curvature of the output coupler and the spacing between the output coupler and the gain element are chosen to provide a nearly hemispherical resonator configuration. When end-pumped using appropriately designed pump optics disposed to receive the pumping mode emissions from at least one visible light pumping diode, the inversion profile created in the co-doped gain medium by the pumping mode beam is overlapped by the resonator mode profile of the lowest order $TEM_{00}$ mode to assure good spatial quality in the emitted output beam, a low laser threshold and, in addition, the compact end pumped laser resonator has a high electrical to optical conversion efficiency. Such a laser is "gain apertured" to produce the low divergence $TEM_{00}$ mode. Appropriate beam shaping in pump relay lenses plus polarization combination of the output of two laser diodes allow scaling of this laser to higher pump power. Initially, laser diode emission is absorbed by the $Cr^{3+}$ activator ion. The $Cr^{3+}$ ion then rapidly and efficiently transfers its excitation to the upper laser level for the neodymium transition. Laser emission is thus efficiently produced at any of the neodymium transitions, including the 1.06 $\mu$m transition and the 1.34 $\mu$m laser transition.

An object of the invention is to provide a co-doped laser for which the pumping efficiency is independent of pump wavelength over a broad range of wavelengths. Another object of the invention is to provide a compact, efficient co-doped laser which is end-pumped by visible laser diodes and for which the pumping efficiency of the gain medium is not sensitive to the exact wavelength or wavelength range over which the visible laser diodes emit.

Another object of the invention is to provide an improved co-doped neodymium laser which can be diode pumped by visible laser diodes operating somewhere in the range between 610 nm and 680 nm.

Still another object of the invention is to provide an improved chromium neodymium co-doped laser which is compact, efficient, lightweight, and may be efficiently end-pumped in the nearly hemispherical resonator mode to provide efficient laser output.

Another object of the invention is to provide a neodymium doped laser material that is co-doped to assure less sensitivity to the wavelength of the visible pumping diodes to allow more efficient operation.

Another object is to provide a co-doped Cr,Nd:GSGG laser material in which the 1.06 $\mu$m neodymium transition is obtained by diode pumping chromium in the range of 610 to 680 nm to produce efficient, compact, low threshold laser operation.

Another object of the invention is to provide a co-doped Cr,Nd:GSAG laser where GSAG is gadolinium scandium aluminum garnet ($Gd_3Sc_2Al_3O_{12}$) laser material, in which the 1.06 $\mu$m neodymium transition is obtained by diode pumping $Cr^{3+}$ in the range of 610 to 680 nm to produce efficient, compact, low threshold laser operation.

Another object of the invention is to provide a co-doped Cr,Nd:YSAG laser where YSAG is yttrium scandium aluminum garnet ($Y_3Sc_2Al_3O_{12}$) laser material, in which the 1.06 $\mu$m neodymium transition is obtained by diode pumping $Cr^{3+}$ in the range of 610 to 680 nm with laser diodes to produce efficient, compact, low threshold laser operation.

Another object of the invention is to provide a co-doped Cr,Nd:LLGG laser, where LLGG is lanthanum lutetium gallium garnet ($La_3Lu_2Ga_3O_{12}$) laser material in which the 1.06 $\mu$m neodymium transition is obtained by diode pumping $Cr^{3+}$ in the range of 610 to 680 nm to produce compact, efficient, low threshold laser operation.

Another object of the invention is to provide a co-doped Cr,Nd:HLMA laser, where HLMA is LaMgAl$_{11}$O$_{19}$ laser material, in which the 1.06 μm neodymium transition is obtained by diode pumping Cr$^{3+}$ in the range of 610 to 680 nm to produce compact, efficient, low threshold laser operation.

These and other objects of the invention will become more readily apparent from the ensuing specification and drawings when taken in conjunction with the appended claims.

DETAILED DESCRIPTION OF THE PREFERRED EMBODIMENTS

An optical laser resonator cavity and associated pump laser diodes produces laser emission at any of the Nd$^{3+}$ ion laser wavelengths. The design of the optical laser resonator cavity disclosed herein is nearly hemispherical for improved resonant end or longitudinal pumping with visible laser diodes. The wavelength range over which the laser system can effectively absorb radiation is determined by the dopant ions used in the laser crystal, the nature of the crystal host itself, and the reflective coatings and transmission of the optical elements in the laser resonator cavity. A number of crystal hosts of the co-dopant ions may be selected.

Figure 1A:
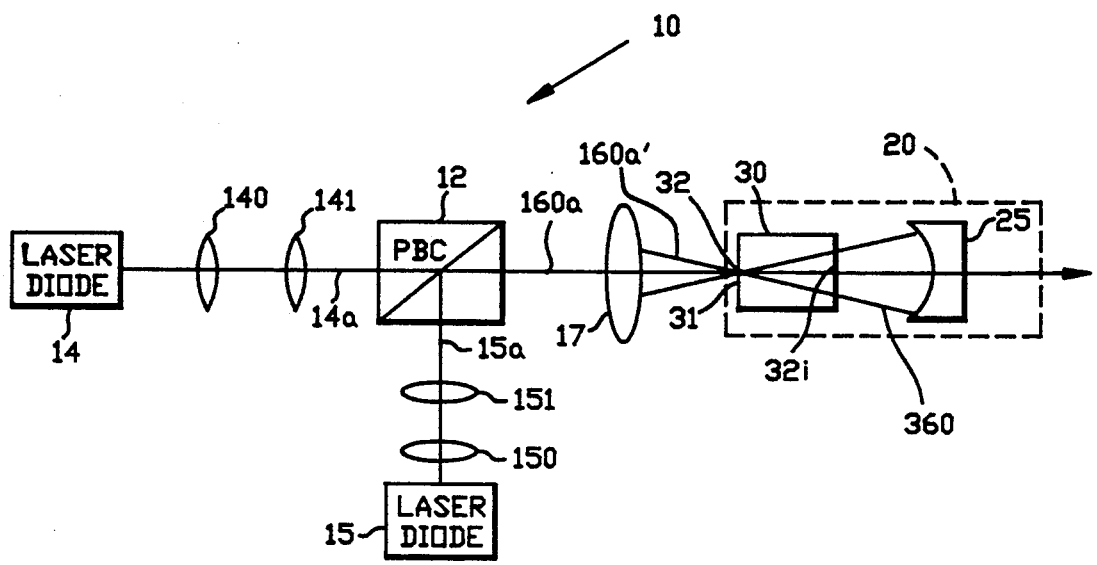
FIG. 1A shows a schematic representation of the principal constituents of this inventive concept depicting the configuration of the pump and hemispherical resonator including the associated optics.

Referring now to the drawings wherein like reference numerals designate identical or corresponding parts throughout the several views, FIG. 1A illustrates a first embodiment of the visible laser diode pumped solid state laser 10. The diode-pumped solid state laser has a resonator 20 defining a resonator cavity that includes a laser rod or crystal gain medium 30. The optical elements of resonator 20 are configured for opeartion in a nearly hemispherical resonator mode where a resonator mode waist 360'w is located at an exterior face 32 of crystal 30. The resonator is further defined by an optically aligned end reflective element, or output coupler 25, and a dichroic coating 31 on laser crystal 30 in the resonator cavity. An exemplary coating 31 may have the properties to be highly reflective at what is known as the neodymium laser transition or emission at 1.06 μm in an exemplary case and highly transmissive at the pump wavelength 610 to 680 nm in this exemplary instance. These properties may vary to accommodate different host materials or other operating parameters in the light of this inventive concept.

A hemispherical resonator mode is a type of stable laser resonator mode. This mode is established with a pair of end reflective mirrors that bound the laser cavity, one of which is concave while the other is flat. The resonator mode shape is conical and its diameter is largest at the curved mirror and smallest at the flat mirror. A hemispherical resonator mode is created when the separation between the flat mirror and the curved mirror is exactly equal to the radius of curvature of the concave mirror. For this case the mode diameter at the flat mirror is zero, and it is infinite at the curved mirror. However, such a mode cannot physically operate in a laser. By slightly reducing the separation between the two mirrors from the hemispherical configuration, however, one establishes a "nearly hemispherical" resonator mode. This mode has the properties of having a very small diameter (or waist) at the flat mirror and a larger but finite waist at the curved mirror. This type of mode is efficient and is ideal for the end-pumping described in this inventive concept. The nearly hemispherical resonator mode is shown in phantom, 360, in the detail of the pump and resonator geometry depicted in FIG. 1B.

In this exemplary configuration, visible laser diode pumped solid state laser 10 of FIG. 1A is described in terms of a Cr,Nd:GSGG laser rod 30 operating, or emitting, at 1.061 μm and pumped by visible light diodes in the range of 610 to 680 nm. It should, however, be remembered that a different laser output wavelength range can be employed by using different reflective coatings on output coupler 25 and coating 31 on laser crystal 30. For example in accordance with this inventive concept, other exemplary neodymium transition or emission wavelengths are about 946 nm, 1.0615 μm, 1.06415 μm, 1.11 μm, 1.12 μm, and 1.34 μm. Other exemplary laser crystal hosts are GSAG, YSGG, YSAG, LLGG, and YAG (Y$_3$Al$_5$O$_{12}$). It is to be understood that in accordance with this inventive concept, these and other emission wavelengths and gain mediums not specifically named herein may be produced and chosen by one skilled in the art to which this invention pertains along with the mere selection of the appropriately disposed reflective end elements and coatings that provide feedback at the appropriate wavelengths.

Figure 2:
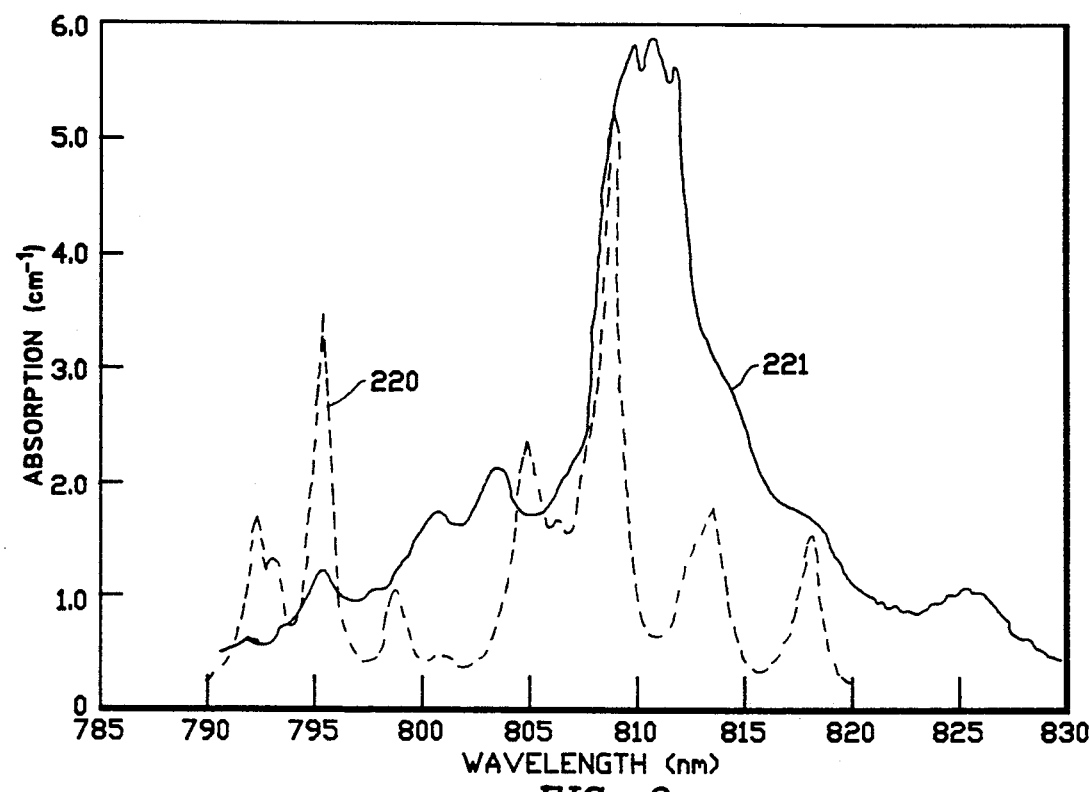
FIG. 2 shows the absorption of Nd:YAG superimposed on the absorption of Nd:BEL.
Figure 3:
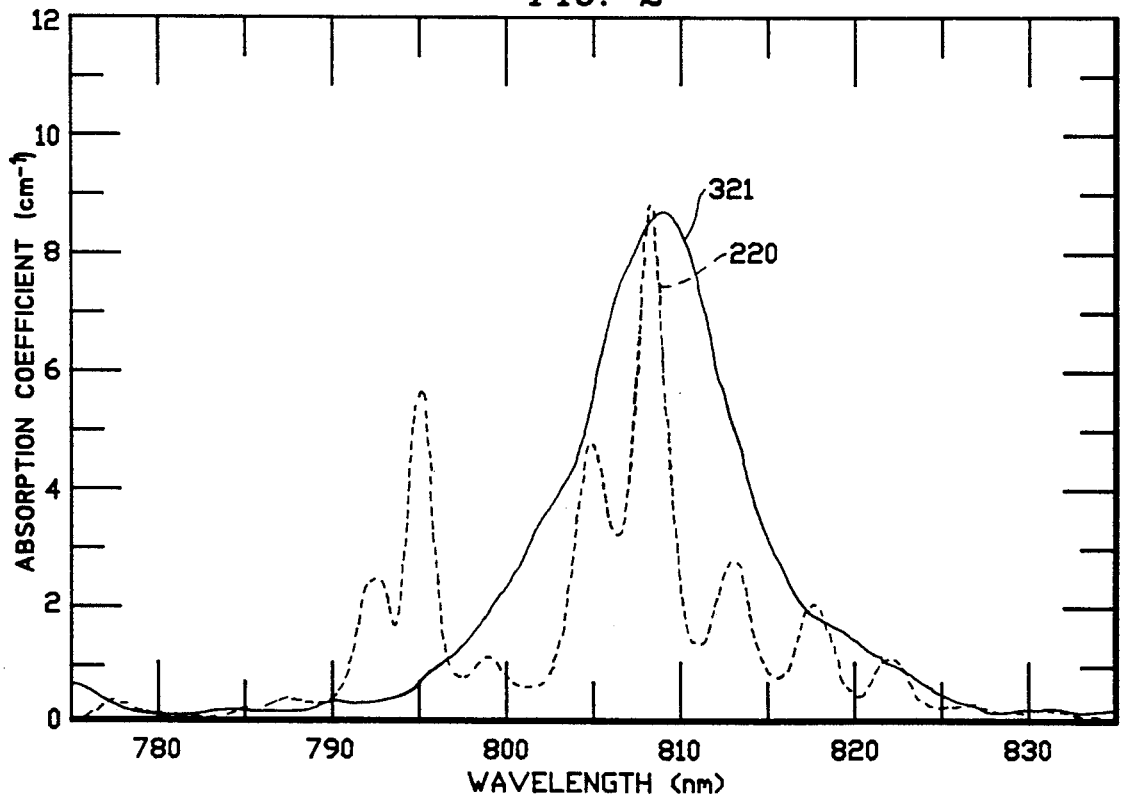
FIG. 3 shows a comparison of the absorption spectrum near 800 nm for Nd:YAG relative to neodymium yttrium vanadate (YVO$_4$).

The desire to obtain a crystal laser host for neodymium in which the pump efficiency is relatively insensitive to the pump wavelength has motivated a number of investigations. FIG. 2 shows the absorption spectrum of Nd:YAG 220, in phantom, which is superimposed on the absorption spectrum of Nd:BEL 221, (BEL is lanthanum beryllate, La$_2$Be$_2$O$_5$) Note that the absorption bandwidth for BEL, curve 221, is substantially broader than that for Nd:YAG, curve 220. In FIG. 3 the absorption spectrum of Nd:YAG 220 in phantom is superimposed on the absorption spectrum of neodymium yttrium vanadate 321 to show that the absorption bandwidth for neodymium yttrium vanadate, curve 321, is substantially broader in the region of 810 nm.

However, in both cases the absorption bandwidth is only 5 to 10 nm wide so that these absorption bandwidths are still a problem in terms of matching to the pumping emission wavelength range of aluminum gallium arsenide (AlGaAs) laser diodes. Individual AlGaAs diodes can emit in a relatively narrow emission bandwidth of approximately 1 to 3 nm anywhere in the range between 750 nm to 850 nm, where the emission wavelength of different diodes is dependent on the specific aluminum concentration contained in the active region of the diode.

Figure 4:
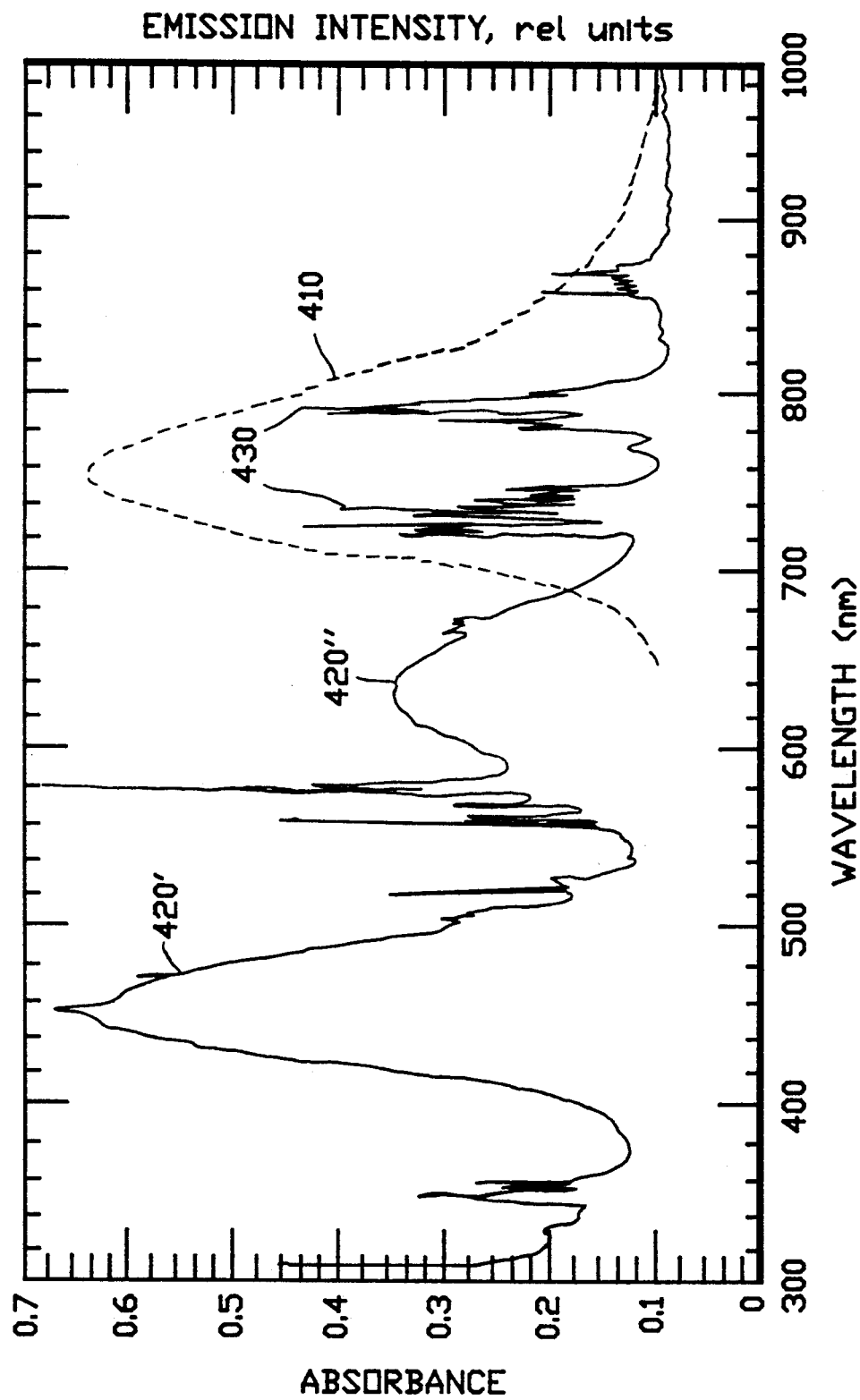
FIG. 4 shows the absorption of Cr,Nd:GSGG and the emission spectrum for Cr$^{3+}$ fluorescence.

FIG. 4 shows the absorption spectrum of co-doped Cr,Nd:GSGG with the $Cr^{3+}$ fluorescence spectrum shown in phantom, curve 410. There are several features of the absorption spectrum that should be noted. There are two broad absorption bands, one centered in the blue near 440 nm, 420', and the other absorption band 420'' centered in the red at approximately 660 nm. These two broad absorption bands are due to the $Cr^{3+}$ ion transition from the $^4A_2$ level to the $^4T_2$ level for the 660 nm band and the $^4A_2$ level to the $^4T_1$ level of $Cr^{3+}$ for the 440 nm band. In addition to these two broad absorption bands, there are other numerous sharp absorption lines. The sharp absorption lines are due to the neodymium ion absorption. Near 800 nm a band of lines 430 corresponds to the absorption bands that are normally used for diode pumped neodymium lasers when pumped by AlGaAs laser diodes. In contrast to the width of these sharp lines the broad transition 420'' of the $Cr^{3+}$ ion is almost as intense but substantially broader than the Nd lines in either $YVO_4$ or BEL. The $Cr^{3+}$ emission band 410 overlaps the strong Nd ion absorption bands 430 in the 700 to 800 nm region, thereby providing a second mechanism for excitation of neodymium through reabsorption of $Cr^{3+}$ emission.

Figure 5:
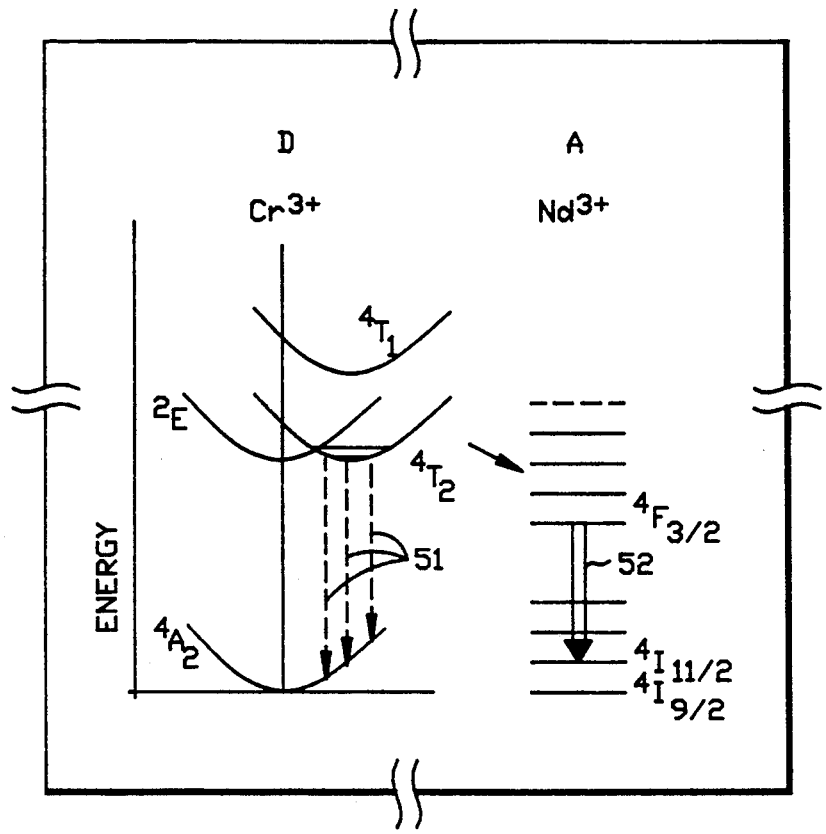
FIG. 5 shows the excitation transfer mechanism in chromium neodymium co-doped laser crystals.

However, the major excitation transfer is a direct photon quenching process, see FIG. 5. $Cr^{3+}$ energy levels are shown on the left hand side. The energy levels for $Cr^{3+}$ are a sensitive function of position of the $Cr^{3+}$ ions relative to the lattice fields. The lattice field strength is represented by the horizontal axis. The broad band 420'' of FIG. 4 centered at 660 nm is due to the $^4A_2$ to the $^4T_2$ transition shown. The fluorescence between 700 to 800 nm is a result of the $^4T_2$ to $^4A_2$ spontaneous emission and is shown by dashed lines 51 in FIG. 5. More importantly, energy quenching by the $Nd^{3+}$ ion, shown schematically on the right hand side of FIG. 5, leads directly to the population of the $^4F_{3/2}$ level of neodymium. This is the upper laser level for numerous neodymium transitions, including the 946 nm, 1.06 $\mu$m and 1.34 $\mu$m transitions. Shown by the vertical arrow 52 on the $Nd^{3+}$ side is the transition from the $^4F_{3/2}$ to the $^4I_{11/2}$ level which brings about the 1.06 $\mu$m transition. The "D" over the $Cr^{3+}$ in FIG. 5 designates that this ion is the donor ion, which means that it is the donor for a quantum of energy to the accepter neodymium ion, designated by an "A" in the figure.

The efficiency of excitation transfer, which refers to the percentage of energy initially residing in the $Cr^{3+}$ ion that is transferred to create a population in the neodymium $^4F_{3/2}$ level, is 87 percent. The other 13 percent is lost either through unabsorbed fluorescence or non-radiative processes. It can thus be seen that excitation of the neodymium ion by initially exciting the $Cr^{3+}$ ion is an effective and practical means of exciting the upper laser level. This has the important advantage of allowing the use of optical pump diodes with emission wavelengths that do not require matching to one of the narrow, strong absorption lines in the $Nd^{3+}$ ion. Excitation transfer from $Cr^{3+}$ is both rapid and efficient and leads to an excited population of $Nd^{3+}$ ions.

In order to effectively pump the $Cr^{3+}$ ions, a monochromatic laser source is desired that operates near the peak of the absorption wavelength which in the case of Cr,Nd:GSGG, is near 660 nm. Aluminum gallium indium phosphide (AlGaInP) laser diodes (visible laser diodes) operate near the peak of the $Cr^{3+}$ red absorption band. The specification for the output wavelength of the AlGaInP laser diodes is substantially relaxed, since they present operating parameters which are a mirror image of the situation for the AlGaAs laser diodes.

With AlGaAs laser diode pumping of neodymium singly doped material, the appropriate pump wavelength range is a small subset of the wavelength range available for an efficient aluminum gallium arsenide laser diode. For example, for the Nd:YAG laser the suitable pumping wavelength range is 808.5 nm ±1 nm. As was mentioned above, the range of output wavelengths for which one can achieve laser operation of an AlGaAs diode runs approximately from 750 nm to 850 nm. However for the aluminum gallium indium phosphide diodes pumping the co-doped material, the situation is just the opposite. The range of output wavelengths available from the aluminum gallium indium phosphide laser diodes is a small subset of the range of wavelengths suitable for efficient pumping of the $Cr^{3+}$ ion. In other words, the absorption bandwidth of $Cr^{3+}$ in Cr,Nd:GSGG is much broader than the range of wavelengths available from the aluminum gallium indium phosphide laser diodes.

Therefore, any laser diode wavelength produced by aluminum gallium indium phosphide laser diodes is appropriate for pumping the chromium co-doped crystal. Wavelength selection is not an issue. Thus, manufacturers' yields, which measure the fraction of laser diodes emitting at a target wavelength relative to all diodes produced from a given growth run, is 100 percent.

It is important to note that visible laser diodes only recently have become a practical and inexpensive means for pumping solid state lasers. For example, the patent cited above by Brandle et al. discusses using a co-doped Cr,Nd:GSGG laser crystal which is pumped by a monochromatic laser source. The patent indicates that pump energy is supplied to the active medium to create a population inversion therein by pumping means well known in the art. However, the visible laser diodes were not well known in the art.

Indeed, visible laser diodes were but a curiosity at the time that the Brandle et al. patent was issued. Visible laser diodes are advantageous to use as a pumping source for the Cr,Nd:GSGG gain element (or other co-doped gain elements). Using visible laser diodes as pumping sources for the co-doped gain elements has provided a needed improvement that advances the state of the art. The recently developed capabilities of visible laser diodes coupled with their availability, lower price, small size and compatibility with specific gain elements allows a host of utilizations where the more bulky and inefficient pumping sources, such as flashlamps and krypton ion lasers, for example would not be suited. An advantage of laser diode pumping of the co-doped gain mediums is the ability to achieve high pump efficiency at any wavelength emitted by the visible laser diodes, This, among other things, provides designers with a more capable and readily available configuration capability for numerous applications that were denied with the conventional approaches used to date.

Furthermore, the extended capabilities of visible laser diodes, which have been referred to above, including their divergence (shown in FIGS. 6A and 6B) and spectral bandwidth, require the combined features as disclosed herein in order to apply and take advantage of their capabilities to provide an efficient, compact, scalable diode pumped co-doped laser. These features include a combined end pumping for either cw or pulsed operation and a nearly hemispherical resonator and will be elaborated on below.

Figure 7:
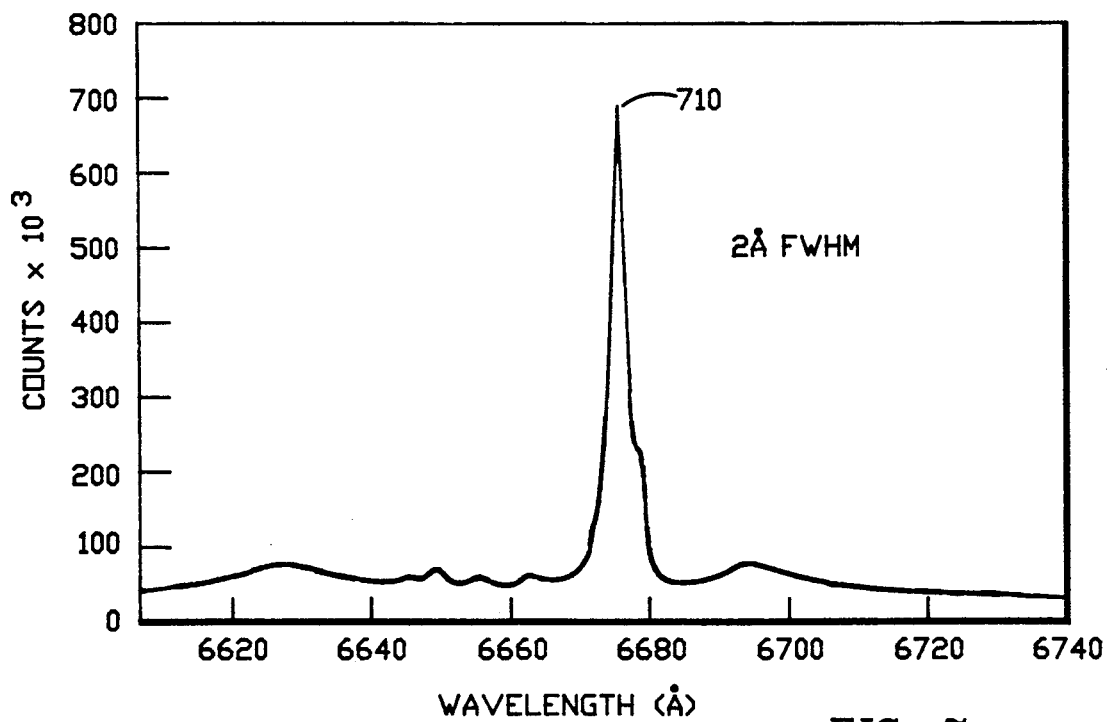
FIG. 7 shows the spectral bandwidth of a single stripe viable laser diode at 265 mW output.

Returning once again now to FIG. 1A, compact, efficient operation of laser 10 pumped by visible laser diodes 14 and 15 are achieved when the unique capabilities of the visible laser diodes are accounted for in terms of the pump geometry disclosed herein. This geometry is substantially different from those demonstrated in the past for AlGaAs laser diodes owing to several of the unique features of the visible laser diodes. Generally, the spectral output of the visible AlGaInP laser diodes is much narrower than the spectral output of the AlGaAs laser diodes of comparable power. This is due in part to the much longer active length (about 1200 $\mu$m for AlGaInP as compared to about 300 $\mu$m cavity lengths for AlGaAs laser diodes). Looking to FIG. 7, the emission bandwidth for a single stripe visible laser diode, curve 710, is about 0.2 nm compared to approximately 3 nm emission bandwidth for a typical, comparable power AlGaAs laser diode. As a consequence, the absorption depth for the pump emission in the co-doped laser crystal is substantially shorter than for comparable diode pumped Nd:YAG or other neodymium singly doped lasers. Therefore, a pump beam of higher divergence can be focussed with the assurance that the pump energy will be deposited within the resonator volume.

Figure 8:
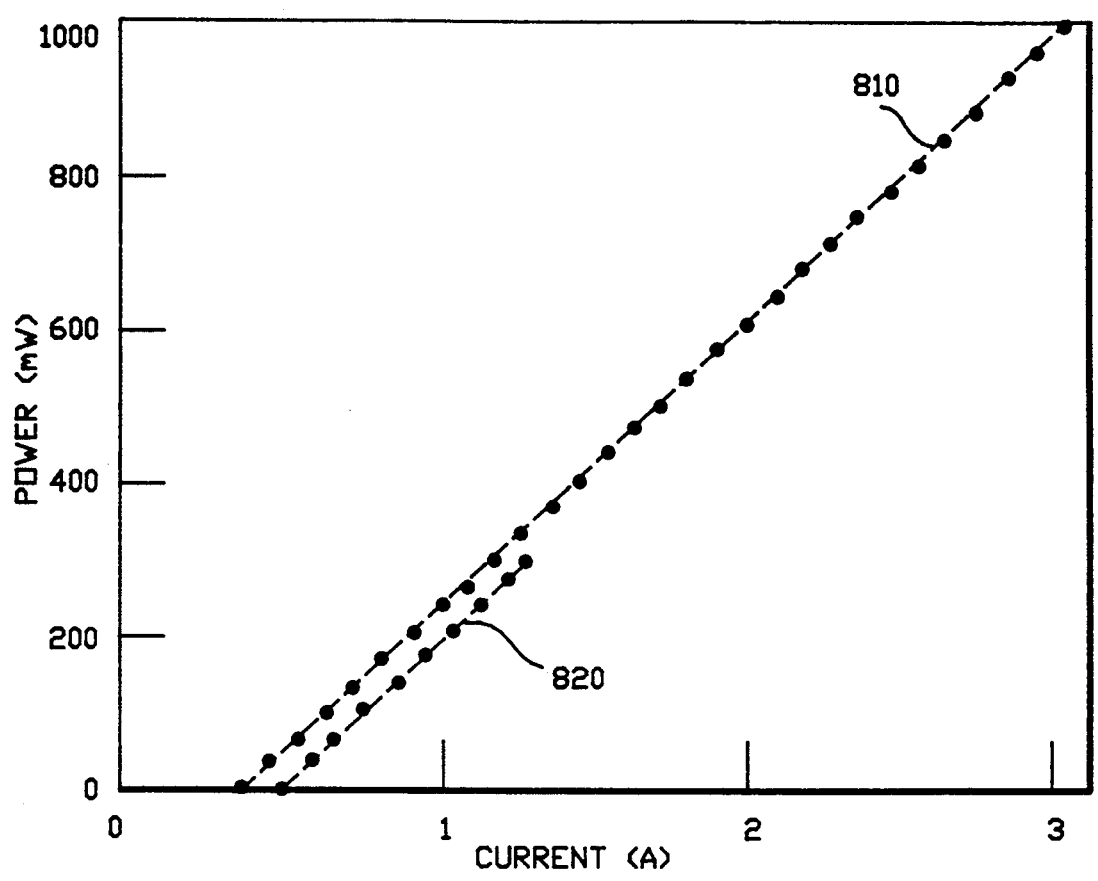
FIG. 8 shows the slope efficiency for a single stripe visible laser diode producing up to 1 Watt of laser power.

The power efficiency shown in FIG. 8 for a visible laser diode that operates up to 1 Watt is substantially lower than has been obtained in AlGaAs laser diodes. Curve 820 represents cw excitation of the diode, while curve 810 is for pulsed excitation with a duty factor of 1%. The lower efficiency is partly the result of the higher bandgap in the quaternary laser diodes (that is, AlGaInP) than for AlGaAs. The lower overall electrical efficiency obtained for the visible or red diodes requires more careful procedures for alignment and construction of the pump optics relative to those required for aluminum gallium arsenide laser diodes.

Figure 6A:
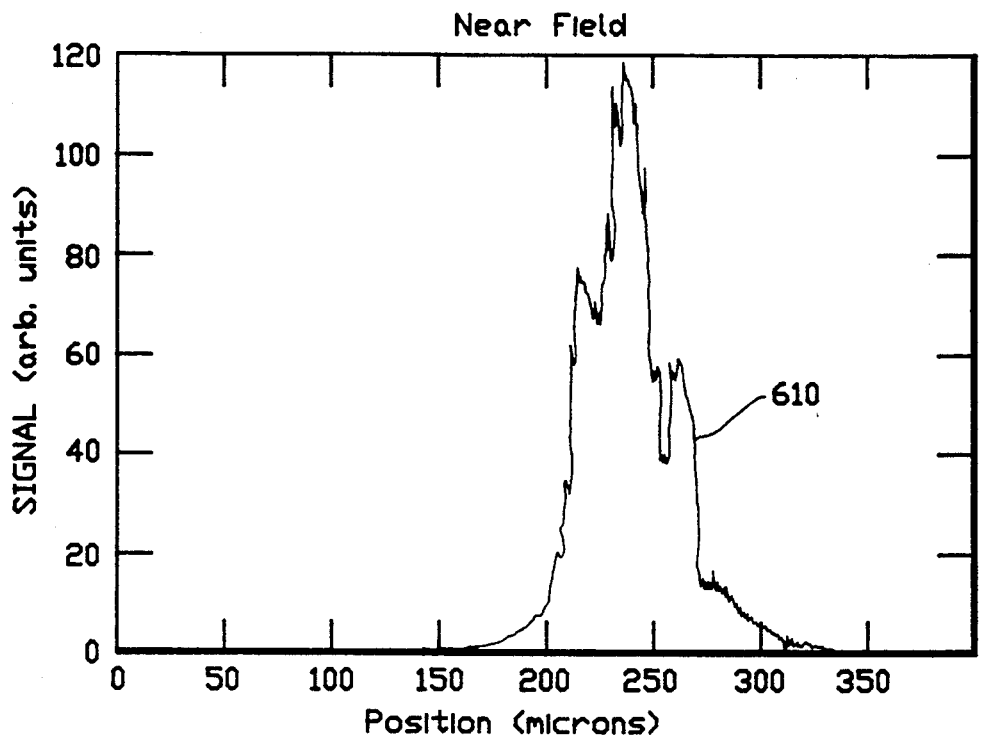
FIG. 6A shows the near field of a 1 Watt visible laser diode.
Figure 6B:
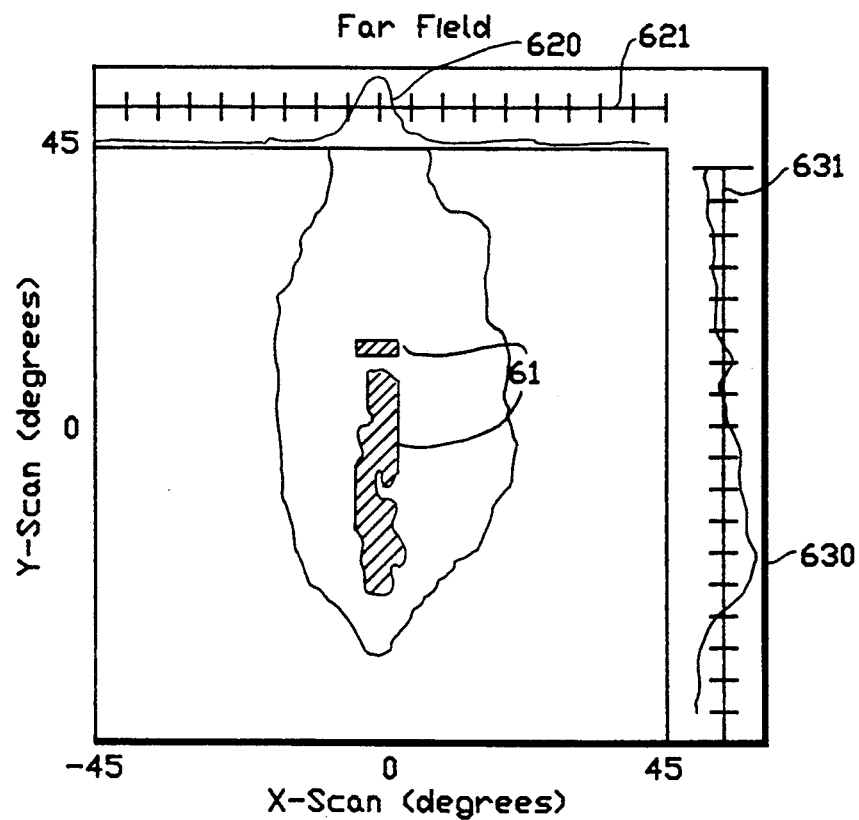
FIG. 6B shows the far field of a 1 Watt visible laser diode.

The most significant features that distinguish th visible laser diodes from the AlGaAs diodes are shown in FIGS. 6A and 6B. FIG. 6A depicts the near field of a 60 $\mu$m wide 1 Watt stripe of a typical visible laser diode. The term "stripe" refers to the active plane of the laser diode and is a common term used in describing laser diode architecture. This architecture will be described more completely below. Rather than a smooth profile, which is desired and is commonly achieved for AlGaAs diodes, some peaks and valleys are observed in the near field. This "structure" is translated into the far field, which is shown in FIG. 6B which represents the laser diode output intensity "topography" in the focal plane (that is, at position 160w in FIG. 1B). The visible laser diodes generally have a much greater divergence in the plane perpendicular to the plane of the junction than the AlGaAs diodes, due to the shorter emission wavelength. The orientation of the laser diode junction in FIG. 6B is parallel to the X axis. Grids 621 and 631 have tic marks at 5° intervals. Curves 620 and 630 represent intensity traces through the centroid of the far field pattern in the plane parallel to, and perpendicular to, the junction, respectively. The intersection of each curve with the respective grid axis represents a half-maximum intensity point of the output power of the visible laser diode in the perpendicular and parallel planes at the focal plane. The divergence of the visible laser diode output each plane in the far field is therefore simply determined by the angular spacing between the pair of curve intersection points with the grid axis. The shaded "islands" labelled 61 bound the angular regions containing 70% of the laser diode output intensity in the focal plane.

As an aid to understanding FIGS. 6A and 6B, a brief description of the several terms associated with laser diode architecture will be presented. First note that lase diodes are small semiconductor devices that contain a p-n junction. A slab of p-doped material is sandwiched to a slab of n-doped material, forming a p-n junction. The junction is planar. A rectangular "stripe" is defined in this junction plane. Excitation current is forced to pass through this stripe as it traverses the p- and n-doped slabs. Thus the stripe acts as an aperture for excitation current and also defines the laser active or gain region. The length of the stripe is generally approximately as long as the semiconductor slab, while its width is usually between 1 $\mu$ and several hundred microns. Laser gain occurs along the long dimension of the stripe and laser output emerges from the junction along the axis determined by the long dimension of the stripe. Upon emerging from the junction, the laser output is not collimated but diverges both in the plane of the junction and perpendicular to the plane. The divergence in each plane is typically very different.

The width of the stripe determines the width of the emission region in the plane of the junction. FIG. 6a shows the intensity profile of light emitted along the 60 $\mu$ width of the stripe. It is a "snapshot" of the emitting facet of the laser diode. The peaks and valleys of FIG. 6A show that the laser output is not uniform across the emitting aperture. FIG. 6B shows the divergence of the laser output in the plane parallel to and perpendicular to the diode junction. The parallel plane is the plane containing the stripe, while the perpendicular plane corresponds to the plane that cuts through the junction. FIG. 6B represents a "snapshot" of the laser intensity taken far away from the emitting semiconductor facet. However, its axes are converted to angular rather than spatial coordinates. It is shown as a "topographical" type map, with the angular regions containing 70% of the diode intensity labelled 61. It is well known that the far field pattern, as described above, is identical to the intensity pattern of the laser diode output at the focal plane (position 160w of FIG. 1B).

The divergence of the visible laser diode output is close to 40° in the direction perpendicular to the junction compared to approximately 10° in the plane parallel to the junction. Therefore, in order to account for both the near field and far field patterns of these visible laser diodes which, as indicated, are substantially different than the divergence of the AlGaAs laser diodes, appropriate optics are called for. Taking into account the spatial extent of the near field (60 $\mu$), a wide field of view, low loss anti-reflective coated, corrected, collimated spherical lens is required for efficient collection and collimation of the visible laser diode output.

These requirements for the visible laser diode collimation lens are more severe and restrictive than those associated with AlGaAs laser diodes, and are dramatically more severe than those for using traditional, collimated lasers such as krypton ion and dye lasers. In addition, owing to the wide divergence in the plane perpendicular to the junction, the collimating lens must have a high numerical aperture. Such lenses are commercially available. These types of collimating lenses typically are not used for AlGaAs laser diodes, but are required for efficient collimation of the visible laser diodes. With collimated lasers such as the krypton ion laser, collimating lenses are not required and therefore were not previously considered by earlier investigators using collimated lasers to pump co-doped Cr,Nd:GSGG.

It should be pointed out that the divergence of the visible laser diodes in the plane perpendicular to the laser junction is due to diffraction, whereas the divergence in the plane parallel to the junction is due to other factors. The visible laser diodes are gain guided, which means that their near field and far field patterns are a function of laser drive power, which is an additional reason why a wide field of view, short working distance, high numerical aperture, collimating lens is needed to effectively and efficiently collimate the laser diode output.

High numerical aperture lenses 140 and 150 shown in FIG. 1A are used to collimate the laser diode output of visible laser diodes 14 and 15, respectively. Because of the nonsymmetric divergence in the plane perpendicular and parallel to the junction, an anamorphic lens pair, made up of a cylindrical lens 141 with spherical lens 140 or a cylindrical lens 151 with a spherical lens 150, is required to provide a collimated beam from each laser diode to the polarization beam combiner 12. If an anamorphic lens pair is not included, the pump beam waist at or near exterior face 32 of laser crystal 30 will be astigmatic. That is, the pump waist in the laser crystal in the plane parallel to the laser diode junction will occur at a different axial position relative to the waist in the laser crystal in the orthogonal plane. Correction for the astigmatism of the visible laser diode source 14 and 15 is provided by cylindrical lenses 141 and 151, respectively, in conjunction with spherical lenses 140 and 150, respectively.

Collimated and corrected beams 14a and 15a are directed to polarization beam combiner cube 12. The polarization of each visible laser diode is in the plane of the junction. Since polarization beam combiner cube 12 transmits one polarization while reflecting the orthogonal polarization, the junctions of visible laser diodes 14 and 15 are rotated 90° with respect to one another. Therefore, at the intersection of beams 15a and 14a in polarization beam combiner cube 12 the two polarizations of beams 15a and 14a are orthogonal. This leads to a single collimated pump beam 160a which contains the two orthogonal polarizations of beams 14a and 15a and the optical power of both laser diodes.

Figure 1B:
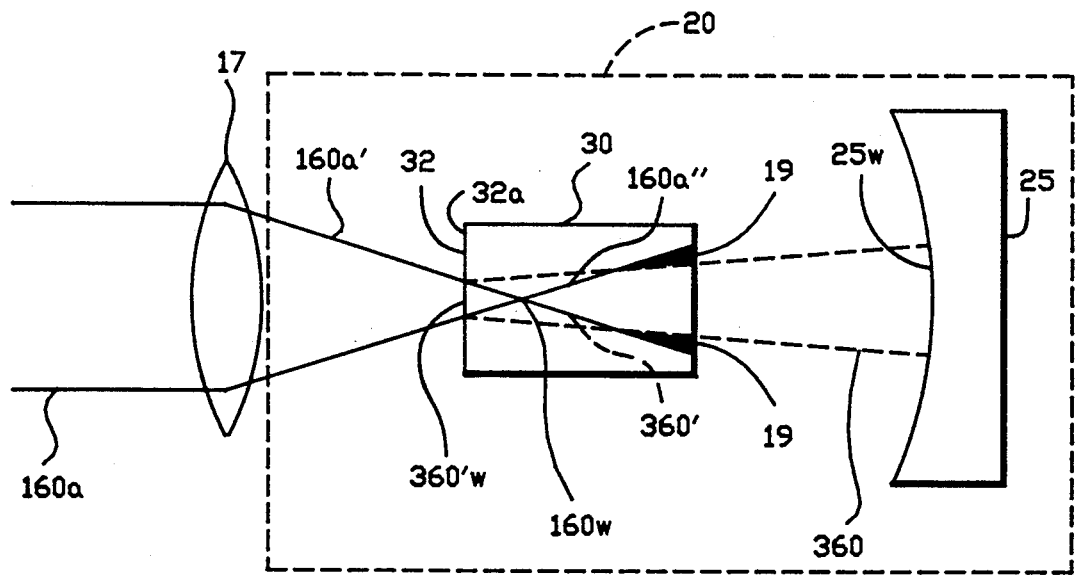
FIG. 1B shows details of the pump and resonator modes in the end-pumped, gain apertured diode-pumped laser.

A detailed schematic representation of the conditions required for efficient end-pumping with the visible laser diodes is shown in FIG. 1B when considered with FIG. 1A. The focal length and aperture of focusing lens 17 is determined by the conditions of providing the smallest practical pump beam waist 160w in laser crystal 30 while matching the divergence of a resonator mode portion 360' of resonator mode 360. It is imperative for good efficiency that the inversion profile created by pump beam 160a being focused into crystal 30 by lens 17, is contained within the resonator mode volume portion 360' of resonator mode 360 that is within crystal 30. Excitation outside of this resonator mode (shaded regions 19 in FIG. 1B) does not contribute to laser operation. Furthermore, by creating a small diameter resonator mode waist 360'w within crystal 30, a gain aperture in the crystal is established, which overlaps the resonator mode volume portion 360', which guarantees TEM$_{00}$ laser operation. TEM$_{00}$ operation is important for low laser beam divergence and is required in order to focus the laser beam to a small spot. Such high intensity focused light is vital for such applications as medical procedure or nonlinear optics. Equally important, TEM$_{00}$ operation leads to low threshold, high slope efficiency operation.

The resonator mode is nearly hemispherical. The actual dimension of the resonator mode waist 360'w is determined by the radius of curvature of concave mirror 25 and the spacing between concave mirror 25 and exterior face 32 of laser crystal 30. As this spacing approaches the radius of curvature of mirror 25, waist 360'w at exterior face 32 becomes smaller. Conversely, reducing the distance between output coupler mirror 25 and highly reflective exterior face 32 (which is highly reflective of the resonator mode) of crystal 30 increases the optical elements is vital for scaling applications when an increase of the pump fluence on crystal 30 and a consequent increase the output laser fluence transmitted through output coupler mirror 25 are desired.

In general, it is not desirable to exactly match the divergence of resonator mode portion 360' within crystal 30 with the cone of diverging pump light 160a" in laser crystal 30. Since the collimated beam diameter of pump light 160a can be as large as 10 mm, a very long focal length may be required for lens 17 to match the relatively narrow divergence of resonator mode portion 360' in laser crystal 30. A very long focal length lens 17 would allow matching of the divergence of both the pumping mode and the resonator mode beams but would create a pump waist that is too large for resonator waist 360'w at exterior face 32. Therefore, it is more desirable to use a short focal length lens 17 to produce a small beam waist 160w with a high pumping beam power density.

In accordance with this inventive concept at least some of the advantages provided by laser resonator 20 are based on the focusing geometry and pump optics. The use of an appropriate focusing lens 17 helps assure that the visible diode pumping beam is contained within the resonator mode volume in the gain material of the laser and is both efficient and effective. The lens provides a proper shaping and locating of the pumping mode and the pumping mode waists in laser crystal 30.

For reasons which will become apparent, exterior face 32 is provided with a dichroic coating that is highly reflective to the resonator mode wavelength and is highly transmissive to the pumping beam within a preselected range of pumping wavelengths. An inner or second face 32i of laser crystal 30 that is parallel with exterior face 32 is provided with an anti-reflective coating that is anti-reflective to the resonator mode wavelength. Both of the faces are flat and polished in accordance with standards and procedures well established in the art to optimize performance.

Resonator mode waist 360'w is produced in resonator 20 at laser exterior face 32, and the smaller pump waist 160w is focused somewhat within the interior of crystal 30 as shown in FIG. 1B. This is arranged so that focused pump beam 160a' at crystal exterior face 32 is converging as it passes through exterior face 32 and its diameter exactly matches the diameter of resonator mode waist 360'w at face 32. As focused beam 160a' propagates into the interior of crystal 30, it continues to get smaller, staying well contained within the bounds of the resonator mode within crystal 30. It eventually reaches a focal point or pump waist 160w within crystal 30, at which point it starts to diverge as a diverging pumping beam 160a'' again. Eventually, the pump mode divergence, being at a much lower f# than the divergence of the resonator mode portion 360' in crystal 30, increases its size to extend beyond the resonator mode. When the pumping mode 160a'' extends beyond the resonator mode volume, there should be virtually no pump fluence remaining in the beam, since the pumping mode fluence has been absorbed within the laser resonator mode portion 360'. Therefore, virtually no pump fluence should be deposited in regions 19 shown in FIG. 1B.

One fundamental reason why the narrow absorption bandwidth of neodymium in most hosts is a severe problem for diode pumping is because all of the pump mode needs to be absorbed within a very short axial distance. Consequently, a very narrow spectral bandwidth of the pump source is needed for a neodymium singly doped material.

In accordance with this inventive concept, an enormous advantage is realized for the co-doped materials using the disclosed visible diode pumping of visible diodes 14 and 15, with longitudinal end pumping and focusing within resonator mode waist 360'w by locating the pump waist 160w in the interior of crystal 30. Excitation is deposited entirely within the nearly hemispherical laser resonator mode. In accordance with the teachings of this inventive concept the utilizing of the broad and strong absorption of the $Cr^{3+}$ ion in the gain material for any wavelength for which a visible light diode, such as AlGaInP, can emit is a marked advance in diode pump efficiency in the state of the art.

Figure 9:
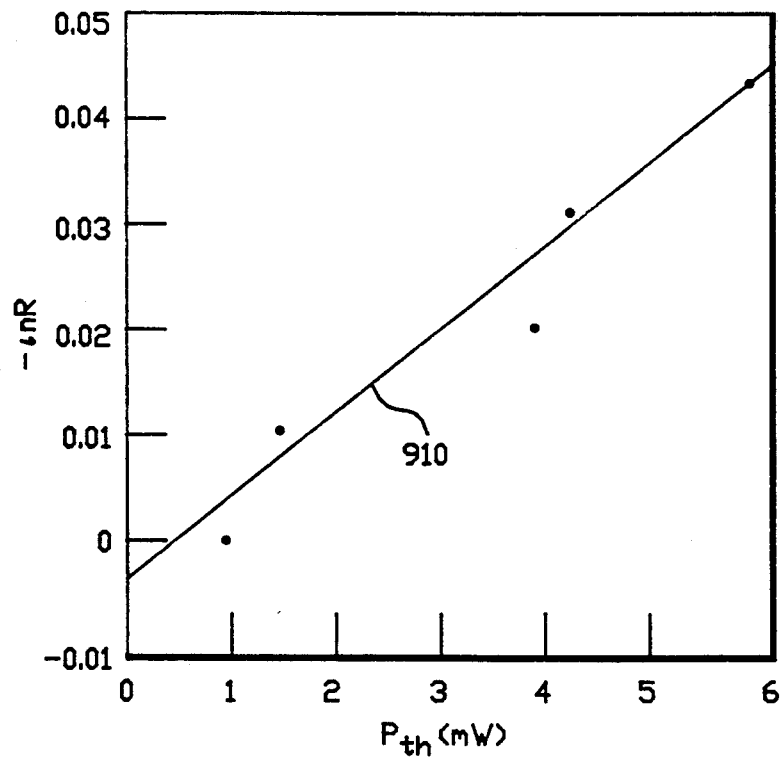
FIG. 9 shows the variation in required threshold pump power to produce laser operation at 1.06 μm as a function of output coupler reflectivity.

Referring now to FIG. 9, the advantages of a co-doped Cr,Nd:GSGG gain medium pumped with visible laser diodes are apparent. The threshold power is plotted as a function of output coupling reflectivity with the dots being representative of data in what is commonly referred to as a Findlay-Clay plot. The straight line 910 is a linear regression fit to the data. It can be seen that the lowest gain medium emission threshold achieved is below 1 mW for the disclosed system using a highly reflective output coupler. The actual laser threshold was 938 $\mu$W for this exemplary system. The range of output coupler reflectivities used in this exemplary case varied from 99.99% R to 96% R.

Figure 10:
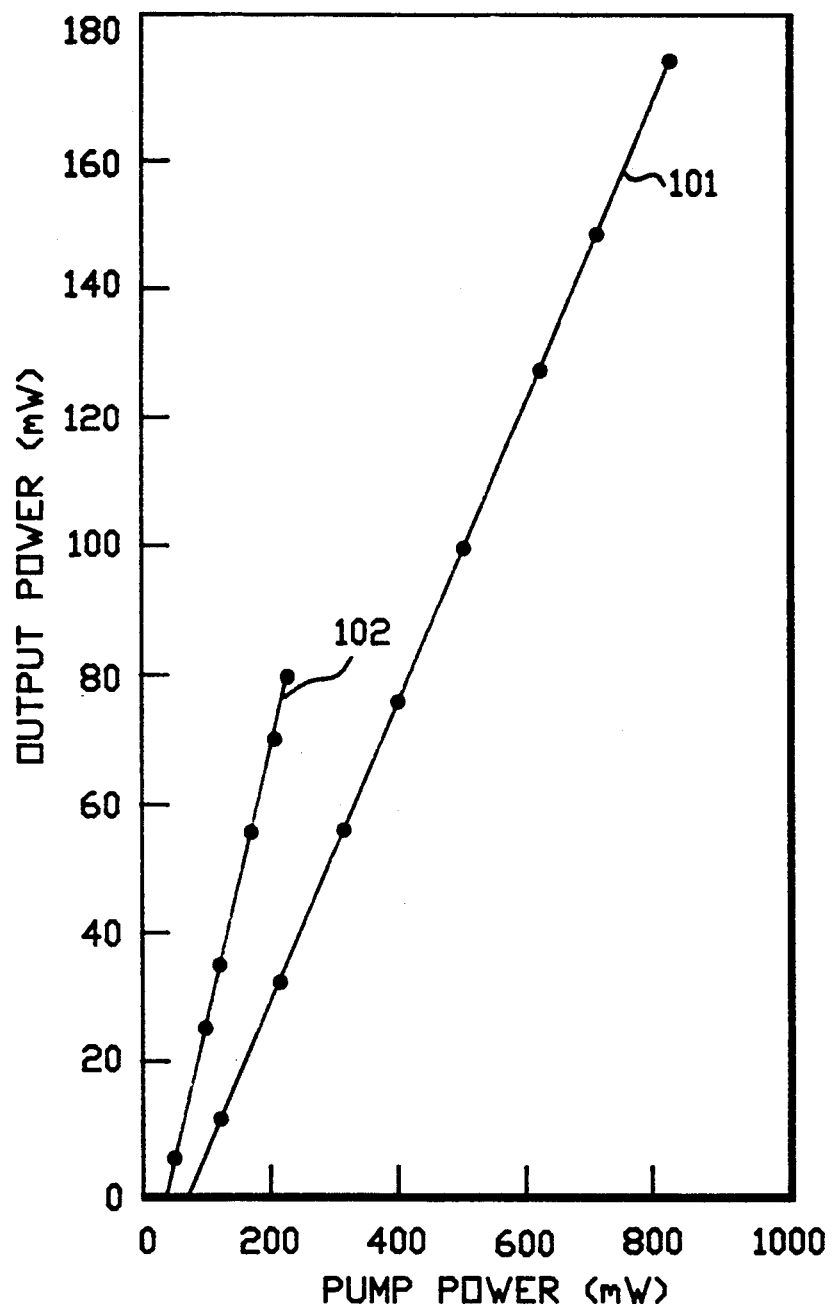
FIG. 10 shows the variation of output power with pump power for two different visible laser diode pumps.

The slope efficiency curves shown in FIG. 10 are derived from two different visible laser diodes, a broad stripe diode where the stripe width was approximately 60 $\mu$m, and a narrow stripe diode the stripe width was about 15 $\mu$. The slope efficiency with the broad stripe diode, curve 101, was approximately 23 percent. The slope efficiency for the narrow stripe diode, curve 102, was 42 percent. The much higher slope efficiency for the narrow stripe diode is due to the ability to focus the narrow stripe diode down to a smaller pump waist 160w within laser crystal 30. In addition, the laser threshold power for the narrow stripe diode is somewhat lower than for the broad stripe diode. The narrow stripe diode, because it was limited in its output power, produced approximately 80 mW while the broad stripe diode produced approximately 175 mW.

The variation in slope efficiencies by using higher power diodes demonstrates scalability of this concept. It is important to note that even with the lower slope efficiency for the higher power laser diode, the overall conversion efficiency was greater than 20 percent for this exemplary case. A further distinction between the present design using visible light diodes to pump co-doped laser materials and those designs using AlGaAs laser diodes to pump singly doped neodymium in a host material is that fine temperature control of the pumping diode junction to control the emitted laser wavelength is not required for the visible light diodes, such as AlGaInP. Again, this is a consequence of the desirable lack of sensitivity to the pump wavelength with respect to the pump efficiency.

Referring once again to FIGS. 1A and 1B, resonator 20 in the exemplary case for which the data in FIGS. 9 and 10 are shown, consists of a 6.25 mm diameter, 5 mm long, Cr,Nd:GSGG laser crystal 30 and a 5 or 10 cm radius of curvature, concave output coupler 25 oriented in a nearly hemispherical configuration. Exterior face 32 of laser crystal 30 was coated for high reflectivity at 1.06 $\mu$m and high transmission at 670 nm while interior face 32i of laser crystal 30 was anti-reflection coated for 1.06 $\mu$m. Two different $Cr^{3+}$ densities were used in the exemplary laser crystal Cr,Nd:GSGG laser rod 30. The Cr,Nd:GSGG rod providing the better results contained $2 \times 10^{20}$ ions per $cm^3$ of both $Cr^{3+}$ and $Nd^{3+}$. The data of FIG. 10 are for this concentration. The second laser rod was dimensioned as the first with the same Nd ion density, but the $Cr^{3+}$ ion density was $1 \times 10^{20}$ ions per $cm^3$.

It must be pointed out that these given densities are for the purpose of demonstration only and are not to be construed as limiting this invention to only these values. One skilled in the art to which this invention pertains, having these teachings in mind, would feel free to vary the densities of either the chromium or neodymium ion, or using other crystal hosts, such as using GSAG or YSAG, as well as changing the pumping source selections to visible laser diodes operating at other wavelengths within the preselected range of wavelengths. Of course lenses, the dichroic coatings and output couplers would be appropriately modified to suitably accommodate the different wavelengths. These modifications to the constituents would be done to accommodate a particular application or to maximize a realization of the salient features of this inventive concept.

Low measured threshold power for the exemplary Cr,Nd:GSGG rod 30 was achieved using a 10 cm radius curvature highly reflective output coupler 25. The absorbed power required to reach threshold was 938 $\mu$W compared to 985 $\mu$W for the other, low $Cr^{3+}$ doped material. These threshold powers are lower than those that have been obtained for diode pumped Nd:YAG resonators using AlGaAs laser diodes. The lowest threshold reported for an AlGaAs laser diode driven Nd:YAG resonator was over 1 mW for a miniature "microchip" laser as stated in the patent by Mooradian, No. 4,953,166.

Since the threshold power depends directly on the resonator loss, the comparison to Nd:YAG provides qualitative credence to the observation that the internal losses of Cr,Nd:GSGG rod 30 is as good as high quality Nd:YAG. The losses in Cr,Nd:GSGG rod 30 were measured directly using two different techniques. The first technique measured the relaxation oscillation frequency as developed in the article by K. Kubodera et al. "Stable LiNdP$_4$O$_{12}$ Miniature Laser," *Applied Optics*, vol. 18, p. 884 (1979), which is related to the cavity losses by $$L = (2\pi f_r)^2 \frac{2\tau(n_1 l_1 + n_2 l_2)}{P_e C} \tag{1}$$

where L represents the round-trip cavity losses including the output coupling,
$P_e = (P - P_{th})/P_{th}$ is the excess pump power,
P is the absorbed pump power,
$n_1$ and $n_2$ are the refractive indices of Cr,Nd:GSGG (1.949) and air, respectively,
$l_1$ and $l_2$ are the path lengths through the rod and air, respectively,
c is the speed of light,
$f_r$ is the relaxation oscillation frequency, and
$\tau$ is the fluorescence lifetime.

With an excess pump power $P_e$ of 14.6 in a 5 cm radius of curvature output coupler 25, the oscillation frequency was measured to be 177 kHz, giving a value of $7.49 \times 10^{-3}$ for the losses. The transmission of the output coupler and HR coating were measured to be $1.93 \times 10^{-3}$ and $1.2 \times 10^{-3}$, respectively, resulting in the round-trip internal resonator loss of $4.4 \times 10^{-3}$.

Resonator 20 losses were also calculated from the dependence of the threshold power on the output coupling and set forth in FIG. 9, see D. Findlay et al.'s "The Measurement of Internal Losses in 4-Level Lasers," *Phys. Letters*, vol. 20, p. 277 (1966). The fit by linear regression leads to a round-trip loss of $3.7 \times 10^{-3}$ and a slope (equal to the round-trip gain) of $7.8 \times 10^{-3}$ mW$^{-1}$. The two values for the resonator loss are in reasonable agreement, giving single pass loss values of 0.44%/cm and 0.37%/cm for the relaxation oscillation and Findlay-Clay methods, respectively. Note that the reflectivity of the anti-reflective coating on face 32i of crystal 30 is included in the residual loss.

The variation of the threshold power of crystal 30 with pump wavelength was measured over the range of 610 nm to 680 nm using a 5 cm radius of curvature high reflective output coupler 25 and was found to remain constant at 1.32±0.16 mW. Output from laser 10 was monitored for temporal spiking as this phenomenon had been observed when laser pumping other Cr$^{3+}$ doped materials. No spiking was observed in the exemplary crystal operated in accordance with this inventive concept.

The slope efficiency was measured for several different output couplers. The best slope efficiencies are shown in FIG. 10 where 42.1 percent was obtained with a 97 percent reflective output coupler 25. It must be noted that in accordance with this inventive concept it is understood that the resonator waist 360'w and pump waist 160w which produced the lowest measured threshold are different from those that produced the highest slope efficiency. This difference is in part due to the higher threshold requirement for lower reflectivity output couplers. An optimum output coupling has been found that produces the maximum slope efficiency. If the output coupling is higher than this, diffractive and internal losses reduce the output power. If the reflectivity is lower than this optimum value, then too much light is be coupled out of the resonator and the extracting fluence will not be high enough to produce the optimum ratio of stimulated to spontaneous emission.

To determine if thermal effects were degrading the output power, the cw visible laser diode pumping power was monitored as a function of time. The visible laser diodes were pulsed and the output was monitored while varying the pump duty cycle and pulse width. For the pump power densities applied herein, no output power degradation was observed.

Referring once again to FIG. 10, the narrow stripe multimode visible laser diode of curve 102 operating at maximum power produced 79.4 mW out. The wider stripe multimode visible laser diode of curve 101 produced a slope efficiency of 22.6 percent, a threshold power of 57.6 mW and maximum output of 173 mW. An important advantage of laser diode pumps compared to other laser pumps, such as krypton ion, is that pulsed and cw operation are generally possible with the same laser diode device. Lasers, such as krypton ion lasers and dye lasers, have been used in previous demonstrations to optically pump Cr,Nd:GSGG. Flashlamps have also been used to pump Cr,Nd:GSGG. However, the laser diode is the only laser pump source that can be easily operated either cw or pulsed simply by changing the temporal drive current format. The means by which the laser diode is operated is determined by the manner in which electrical energy delivered to the diodes. If the current driving the diode is DC, then the operation of the laser diode will be cw and the operation of the Cr,Nd:GSGG can also be cw. If the electrical drive current to the laser diode is pulsed, then pulsed operation is produced by the laser diode. Consequently, pulsed operation of the Cr,Nd:GSGG is obtained.

External modulators could be placed in front of any given cw-pumped laser to generate a pulsed pumping effect. However, this is generally an inefficient means of producing pulsed pumping since the electrical drive current to generate a pumping output in the pump laser is on continuously. When the modulation prevents the laser pump emission from pumping the Cr,Nd:GSGG co-doped laser crystal, the electrical drive current is, in essence, wasted power. When the pulsed operation is obtained by pulsing the electrical power to the laser diode, a more efficient means of generating pulsed output is produced.

It is to be noted that the quantum defect, the ratio of pump photon energy to laser output photon energy, is 0.63 for the 1.06 $\mu$m transition in Cr,Nd:GSGG compared to 0.76 for the same transition in Nd:YAG pumped by 808 nm diodes. This may lead to additional thermal loading which would impact the design of a high average power diode-pumped Cr,Nd:GSGG laser. However, some of these issues have been successfully approached in designing diode pumped 1.3 $\mu$m Nd:YAG lasers, for which the quantum defect is 0.61.

Dividing the slope efficiency measured for Cr,Nd:GSGG by the quantum defect gives a photon slope efficiency of 66.8 percent. By further factoring out the efficiency for chromium to neodymium excitation transfer which has been found to be 0.87, the resulting adjusted slope efficiency is as high as that reported in the article by R. Scheps, "Efficient Laser Diode Pumped Nd Lasers," *Applied Optics*, vol. 28, p. 89 (1989) for end-pumped Nd:YAG. Taking the above factors into account, the maximum slope efficiency for visible diode pumping of Cr,Nd:GSGG is 54.2 percent.

Focused laser resonator cavity mode 360 in laser crystal 30 establishes a gain aperture as discussed above, thereby promoting operation in the lowest order spatial mode of the resonator cavity and obviating the need for the insertion of a lossy hard aperture for achieving low order spatial mode operation. A hard aperture is required generally for other types of pumping such as side pumping when the lowest order spatial mode operation in the solid state laser is sought.

Laser crystal 30 can be any practicable length. In the exemplary case it is 5 mm long. The length is selected to provide adequate gain at the desired operating, emitting wavelength and adequate absorption of the pump laser fluence. In addition to adjusting the length of the crystal, the concentration of each of the dopants is also adjustable. In the preferred embodiment of the Cr,Nd:GSGG laser the doping density for both $Cr^{3+}$ and $Nd^{3+}$ was $2 \times 10^{20}$ ions/cm$^3$. But for other dopant and host combinations, the dopant densities generally will be adjusted such that the absorption of the pump light by the laser crystal 30 is sufficiently high, usually in the range of 80 to 100 percent. The gain minus the passive loss in the crystal must be adequate to provide operation over a predetermined range of wavelengths.

An important feature of the present inventive concept is the establishment of a nearly hemispherical laser resonator mode 360 including portion 360' in FIGS. 1 places resonator waist 360'w, which is the smallest diameter of the TEM$_{00}$ resonator mode, at exterior face 32 of crystal 30. This allows an effective and highly efficient deposition of the focused pump beam 160a' by focusing lens 17 to a location near exterior face 32 of crystal 30 as has been previously described. In addition, the divergence of the resonator mode within the crystal is high enough to provide adequate overlap between the pumping mode and the resonator mode over the axial distance where the majority of pump fluence is absorbed. The nearly hemispherical resonator mode locates the largest waist 25w in FIG. 1B at output coupler 25 and therefore care must be exercised to prevent high diffractive losses at the output coupler. These diffractive losses occur if the resonator mode size at output coupler 25 is a significant fraction of the output mirror diameter and are well known to those skilled in the art.

The establishment of a nearly hemispherical resonator mode 360 in resonator 20 of laser 10 of FIGS. 1A and 1B is essential to providing low threshold operation of laser 10, high pump efficiency based on longitudinal or end pumping, and high slope efficiency. At least one of the visible laser diodes is optically aligned to direct the emitted pump beam 160a within a preselected range of pumping wavelengths to effect an optical end pumping of the laser crystal in the hemispherical resonator mode. The emitted pumping beam produces an optical emission of the resonator mode wavelength. Pump beam 160a may be cw or pulsed without requiring a change of visible laser diodes 15 and 14, thereby providing versatile operation and convenience.

An important aspect of this inventive concept lies in the extremely high efficiencies achievable by visible laser diode pumping to provide the features of being lightweight, compact, portable and scalable. A laser in accordance with this inventive concept has a wide range of applications, including various medical, sensing, pollution monitoring, laser ranging, wind speed and wind shear measurement applications, surveillance and communications, among others.

Obviously, many modifications and variations of the present invention are possible in the light of the above teachings. It is therefore to be understood that within the scope of the appended claims, the invention may be practiced otherwise than as specifically described.

I claim:

1. A solid state laser for emitting at least one resonator mode wavelength in response to being pumped with a narrow width pumping beam within a preselected range of pumping wavelengths between 610 and 680 nm comprising:

a resonator for said at least one resonator mode wavelength arranged to define a nearly hemispherical resonator mode therein, said resonator including at least one highly reflective output coupler concave mirror and a laser crystal co-doped with $Cr^{3+}$ ions and $Nd^{3+}$ ions, said laser crystal being provided with a first face parallel to a second face with each face being flat and polished, said first face being provided with a dichroic coating being highly reflective to said resonator mode wavelength and being highly transmissive to said pumping beam within said preselected range of pumping wavelengths and said second face being provided with an anti-reflective coating being anti-reflective to said resonator mode wavelength and at least one visible laser diode optically aligned to emit said pumping beam within said preselected range of pumping wavelengths between 610 and 680 nm to effect optical end pumping of said laser crystal in said nearly hemispherical resonator mode, said at least one visible laser diode emitting said pumping beam within a preselected range of pumping wavelengths optical emission of said resonator mode wavelength at an improved electrical to optical efficiency.

2. The laser of claim 1 further including:

a lens appropriately disposed and shaped to focus said pumping beam into a pumping mode waist inside said nearly hemispherical resonator mode in said laser crystal and to direct a focused said pumping beam to have a diameter at said first face of said laser crystal which is n larger than the diameter of said nearly hemispherical resonator mode at said first face and a divergence of the focused pumping beam is greater than the divergence of said nearly hemispherical resonator mode and fluence in the focused said pumping beam is absorbed primarily within the volume defined by said nearly hemispherical resonator mode.

3. The laser of claim 2 in which said laser crystal is a crystal of Cr,Nd:GSGG.

4. The laser of claim 3 wherein the density of neodymium and chromium ions in the GSGG crystal is equal to one another and is $2 \times 10^{20}$ ions/cm$^3$.

5. The laser of claim 2 in which said laser crystal is composed of Cr,Nd:GSAG.

6. The laser of claim 2 in which said laser crystal is composed of Cr,Nd:YSAG.

7. The laser of claim 2 in which said laser crystal is composed of Cr,Nd:YSGG.

8. The laser of claim 2 in which said laser crystal is composed of Cr,Nd:HLMA.

9. The laser of claim 2 in which said laser crystal is composed of Cr,Nd:LLGG.

10. The laser of claim 1 wherein said at least one visible laser diode is an aluminum gallium indium phosphide laser diode.

11. A laser according to claim 10 in which said at least one visible laser diode is a cw diode, pumping to effect said laser transition in said laser crystal.

12. The laser of claim 10 in which said at least one visible laser diode is a pulsed laser diode pumping to effect said laser transition in said laser crystal.

13. The laser of claim 1 in which said laser crystal contains two activator ions, one an energy donor, another an energy acceptor, said donor ion is strongly absorbent at the pump wavelength and effectively quenched by said acceptor ion.

14. The laser of claim 1 in which said at least one resonator mode wavelength is 1.06 μm.

15. The laser of claim 1 in which said at least one resonator mode wavelength is 1.34 μm.

16. The laser of claim 1 in which said at least one resonator mode wavelength is 946 nm.

* * * * *

UNITED STATES PATENT AND TRADEMARK OFFICE
CERTIFICATE OF CORRECTION

PATENT NO. : 5,285,467 Page 1 of 1
APPLICATION NO. : 08/021948
DATED : February 8, 1994
INVENTOR(S) : Richard Scheps It is certified that error appears in the above-identified patent and that said Letters Patent is hereby corrected as shown below:

Column 1, line 17, the Pat. No. "5,200,922" should be replaced with --5,200,972--.

Signed and Sealed this

Twenty-first Day of August, 2007

JON W. DUDAS
*Director of the United States Patent and Trademark Office*